(12) United States Patent
Schauer (10) Patent No.: US 8,539,257 B2
(45) Date of Patent: Sep. 17, 2013

(54) METHOD AND APPARATUS FOR DETECTING AN IDLE MODE OF PROCESSING EQUIPMENT

(75) Inventor: Ronald Vern Schauer, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 674 days.

(21) Appl. No.: 12/574,731

(22) Filed: Oct. 7, 2009

(65) Prior Publication Data

US 2010/0106992 A1 Apr. 29, 2010

Related U.S. Application Data

(60) Provisional application No. 61/103,912, filed on Oct. 8, 2008.

(51) Int. Cl.
*G06F 1/32* (2006.01)

(52) U.S. Cl.
USPC ........... 713/300; 713/320; 713/323; 713/324; 438/5

(58) Field of Classification Search
USPC ................. 713/300, 320, 323, 324; 165/279; 438/5, 10, 14, 17
See application file for complete search history.

(56) References Cited

U.S. PATENT DOCUMENTS

| | | | |
|---|---|---|---|
| 5,749,346 A * | 5/1998 | Halvorson et al. | 123/486 |
| 6,197,116 B1 | 3/2001 | Kosugi | |
| 6,323,129 B1 | 11/2001 | Moutinho | |
| 6,455,437 B1 | 9/2002 | Davidow et al. | |
| 6,973,026 B1 * | 12/2005 | Dyrga et al. | 370/218 |
| 7,201,851 B2 * | 4/2007 | Kitoku et al. | 216/58 |
| 2004/0069752 A1 * | 4/2004 | Ulrich et al. | 219/121.39 |
| 2004/0121494 A1 * | 6/2004 | Arno | 438/7 |
| 2007/0057048 A1 * | 3/2007 | Plotkin et al. | 235/382 |
| 2007/0235060 A1 | 10/2007 | Takizawa et al. | |
| 2008/0262655 A1 * | 10/2008 | Smith et al. | 700/247 |
| 2008/0290041 A1 | 11/2008 | Clark et al. | |
| 2009/0216061 A1 | 8/2009 | Clark et al. | |
| 2009/0222128 A1 | 9/2009 | Clark et al. | |

OTHER PUBLICATIONS

International Search Report and Written Opinion mailed May 4, 2010 for PCT Application No. PCT/US2009/059899.

* cited by examiner

*Primary Examiner* — Paul Yanchus, III
(74) *Attorney, Agent, or Firm* — Moser Taboada; Alan Taboada (57) ABSTRACT

Methods and apparatus for detecting an idle mode of processing equipment are provided herein. In some embodiments, an apparatus for monitoring a processing system may include a first system adapter for monitoring a first process chamber and determining a state thereof; and a first support adapter for communicating with the first system adapter and a first support system coupled to the first process chamber, the support adapter configured to communicate a readiness to operate the first support system at a low power mode to a controller of the support system in response to the state of the first process chamber being in an idle mode.

22 Claims, 4 Drawing Sheets

METHOD AND APPARATUS FOR DETECTING AN IDLE MODE OF PROCESSING EQUIPMENT

CROSS-REFERENCE TO RELATED APPLICATIONS

This application claims benefit of U.S. provisional application Ser. No. 61/103,912, filed Oct. 8, 2008, which is herein incorporated by reference.

BACKGROUND

1. Field

Embodiments of the present invention generally relate to processing equipment, and more particularly to an apparatus for monitoring such processing equipment.

2. Description of the Related Art

In semiconductor, flat panel, photovoltaic, and other silicon or thin film processing systems, for example, it may be desired to operate process equipment in a low power mode when the process equipment is in idle state. For example, it may be desired to operate an abatement system or other equipment that is coupled to one or more process chambers in a low power mode when all of the process chambers are in an idle state. In some systems, the presence or absence of a wafer cassette is monitored to signal the abatement system to operate in a low power mode, for example, when a wafer cassette is not present. However, such an indicator is not a reliable measure of idle equipment because the equipment may be operating a waferless process, such as chamber cleaning or conditioning. Moreover, some monitoring apparatus can be accidentally or purposefully bypassed, or fooled, for example, by disconnecting the monitoring apparatus from the indicator signal.

Accordingly, the present inventor has provided an apparatus for monitoring processing equipment which can provide a reliable indication that the equipment is idle and ready for operation in a low power mode.

SUMMARY

Methods and apparatus for detecting an idle mode of semiconductor processing equipment are provided herein. In some embodiments, an apparatus for monitoring a processing system may include a first system adapter for monitoring a first process chamber and determining a state thereof; and a first support adapter for communicating with the first system adapter and a first support system coupled to the process chamber, wherein the first support adapter is configured to communicate a readiness to operate the first support system at a low power mode to a controller of the support system in response to the state of the first process chamber being in an idle mode. In some embodiments, the apparatus further comprises a second system adapter for monitoring a second process chamber and determining a state thereof, wherein the second system adapter is configured to communicate with the first system adapter.

In some embodiments, the apparatus further comprises a second system adapter for monitoring a second process chamber and determining a state thereof; and a second support adapter for communicating with the second system adapter and a second support system coupled to the second process chamber, the second support adapter configured to communicate a readiness to operate the second support system at a low power mode in response to the state of the second process chamber.

In some embodiments, a method of conserving energy in a substrate processing system may include providing a first system adapter coupled to a first process chamber; providing a first support adapter coupled to a first support system; developing a secure communication link between the first system adapter and the first support adapter; monitoring the first process chamber with the first system adapter to determine a state thereof; and communicating a readiness to operate the support system at a low power mode to a controller of the support system in response to the state of the process chamber being in an idle mode.

Other embodiments of the present inventive methods and apparatus are provided below in the detailed description.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The drawings have been simplified for clarity and are not drawn to scale. To facilitate understanding, identical reference numerals have been used, wherever possible, to designate identical elements that are common to the figures. It is contemplated that some elements of one embodiment may be beneficially incorporated in other embodiments.

DETAILED DESCRIPTION

Methods and apparatus for detecting an idle mode of processing equipment are provided herein. The inventive apparatus advantageously monitors a plurality of indicators to confirm that the process chamber is in an idle state prior to operating support equipment, such as an abatement system, at a low power mode. Further, the inventive apparatus is failsafe, to ensure that the abatement or other support systems do not improperly operate in low power mode. The apparatus may be retrofittable onto existing processing systems by providing a system adapter for determining a state of a process chamber and a support adapter for communicating with the system adapter and for instructing a support system, for example an abatement system, coupled to the process chamber when it can operate in low power mode. The inventive apparatus thus facilitates reducing energy consumption in idle process systems.

Figure 1:
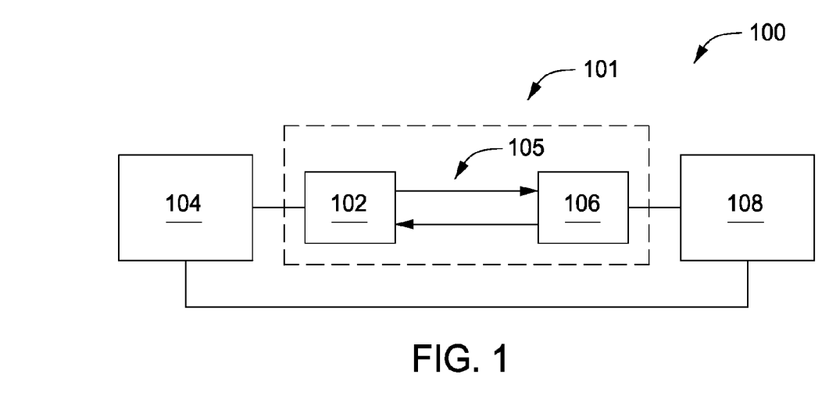
FIG. 1 depicts a semiconductor processing system for use in accordance with some embodiments of the present invention.

FIG. 1 depicts an exemplary processing system 100 and apparatus 101 for the monitoring thereof. Exemplary processing systems that may be utilized with the present invention include those configured for semiconductor, flat panel, photovoltaic, solar, other silicon and thin film processing, and the like. The processing system 100 includes a process chamber, such as a semiconductor process chamber 104 coupled to a support system, such as an abatement system 108. The apparatus 101 for monitoring the processing system 100 includes a system adapter 102 and a support adapter, such as an abatement adapter 106. The system adapter 102 is coupled to the semiconductor process chamber 104 for monitoring a state of the chamber. For example, the system adapter 102 may monitor one or more indicators to determine whether or not the chamber 104 is in an idle state. The abatement adapter 106 is coupled to the abatement system 108 for selectively providing a signal to the abatement system 108 that it may operate in a low power mode upon confirmation that the chamber 104 is idle. The system adapter 102 and abatement adapter 106 communicate by a signaling method (as indicated by 105) to ensure proper operation, as discussed below. In some embodiments, the system adapter 102 and abatement adapter 106 may communicate utilizing a failsafe, two-way communication protocol between the system adapter 102 and the abatement adapter 106 to ensure operation of the abatement system 108 in a low power mode only when the process chamber 104 is in an idle state. As used herein, failsafe refers to the fact that failure of any component, including the signaling components of the system adapter 102 or the abatement adapter 106 will result in the abatement system 108 running in normal power mode to avoid any accidental (or purposeful) bypassing of the abatement system 108 that may result in introduction of non-abated effluent into the environment due to the abatement system 108 improperly running in a low-power mode.

The process chamber 104 may be any suitable chamber for processing a substrate, such as semiconductor substrate. For example, the process chamber 104 may be configured for performing gas phase or liquid phase processes. Non-limiting examples of such gas phase processes may include dry chemical etching, plasma etching, plasma oxidation, plasma nitridation, rapid thermal oxidation, epitaxial deposition, and the like. Non-limiting examples of such liquid phase processes may include wet chemical etching, physical liquid deposition and the like. An exemplary process chamber 104 may, for example, include a substrate support, gas panel for providing one or more process gases, and a means of distributing the process gases in the process chamber, for example, a showerhead or nozzle. The chamber may be configured for providing a capacitively coupled, inductively coupled, or remote plasma. The chamber may include one or more heating lamps, for example, when configured for rapid thermal processes (RTP) or epitaxial deposition processes.

The substrate processed in the process chamber 104 may be any suitable substrate processed in a semiconductor process chamber. The substrate may comprise a material such as crystalline silicon (e.g., Si<100> or Si<111>), silicon oxide, strained silicon, silicon germanium, doped or undoped polysilicon, doped or undoped silicon wafers, patterned or non-patterned wafers, silicon on insulator (SOI), carbon doped silicon oxides, silicon nitride, doped silicon, germanium, gallium arsenide, glass, sapphire, or the like. The substrate may also be a wafer, a display substrate (such as a liquid crystal display (LCD), a plasma display, an electro luminescence (EL) lamp display, or the like), a solar cell array substrate, a light emitting diode (LED) substrate, or the like. The substrate may have various dimensions, such as 200 mm or 300 mm diameter wafers, as well as rectangular or square panels.

The process chamber 104 may be configured, for example, to deposit a layer of material on the substrate, to introduce a dopant to the substrate, to etch the substrate or a material deposited on the substrate, to otherwise treat the substrate, or the like. Such layers deposited on the substrate may include layers for use in a semiconductor device, for example, a metal oxide semiconductor field effect transistor (MOSFET) or a flash memory device. Such layers may include silicon-containing layers, such as polysilicon, silicon nitride, silicon oxide, silicon oxynitride, metal silicide, or alternatively, metal containing layers, such as copper, nickel, gold, or tin containing layers, or metal oxide layers, for example hafnium oxide. Other deposited layers may include, for example, sacrificial layers such as etch stop layers, photoresist layers, hardmask layers, and the like.

The process chamber 104 may use any suitable process gas and/or process gas mixture, for example, to form a layer atop the substrate, to remove material from the substrate, or to otherwise react with material layers exposed upon the substrate, or the like. Such process gases may include silicon-containing gases, such as silane ($SiH_4$), dichlorosilane ($Cl_2SiH_2$), or the like; and/or metal-containing gases, such as metalorganics, metal halides or the like. Other process gases may include inert gases, such as helium (He), argon (Ar), nitrogen ($N_2$), or the like; and/or reactive gases, such as halogen-containing gases, oxygen ($O_2$), hydrogen fluoride (HF), hydrogen chloride (HCl), hydrogen bromide (HBr), or the like.

Accordingly, any process gas or liquid, process gas or liquid mixture, substrate, deposited materials, removed materials, or combinations thereof may comprise and/or combine to form effluents that are exhausted from the process chamber. The effluents may include un-reacted or excess portions of a process gas or chemical agent used for processing the substrate or cleaning the chamber and/or chamber components such as re-usable process kits or process kit shields. The effluents generated in these processes can include different compositions of flammable and/or corrosive compounds, sub-micron sized process residue particulates and gas phase nucleated materials, and other hazardous or environmentally polluting compounds. For example, the effluent may contain different compositions of halogen containing gases, perfluorocompounds (PFCs), chlorfluorocompounds (CFCs), hazardous air products (HAPs), volatile organic compounds (VOCs), global warming gases (GWGs), flammable and toxic gases, and the like Effluents from the process chamber 104 (exhausted via, for example, a gas or liquid exhaust system) are directed to the abatement system 108. The abatement system 108 operates to convert the effluent to an environmentally safe material. For example, in a process chamber configured for a gas phase process, a gaseous effluent may be exhausted through a pump port of the process chamber and may be flowed from the process chamber into the abatement system 108.

The abatement system 108 may be any suitable abatement system for receiving and processing the effluent from a semiconductor process chamber, for example, the process chamber 104. The abatement system 108 may be employed to abate a single process chamber or tool, or multiple process chambers and/or tools. The abatement system 108 may use, for example, thermal, wet scrubbing, dry scrubbing, catalytic, plasma and/or similar means for the treatment of the effluent, as well as processes for converting the effluent to less toxic forms. The abatement system 108 may further include multiple abatement systems for processing particular types of effluents from the process chamber 104.

An exemplary abatement system, for example, may include one or more of a scrubber, a thermal reactor (i.e., combustion reactor), a hydrogenation reactor, or the like. For example, an effluent exhausted from a chamber configured for etch processes may include halogens such as chlorine ($Cl_2$) and unsaturated hydrocarbons, such as ethylene ($C_2H_4$) or propylene ($C_3H_6$). The effluent, for example, may be initially injected into hydrogenation reactor which can be used to convert unsaturated hydrocarbons into saturated hydrocarbons, or halogens into hydrogen-containing gases. For example, chlorine ($Cl_2$) may be converted into hydrochloric acid (HCl), and ethylene ($C_2H_4$) may be converted into ethane ($C_2H_6$).

An effluent treated in a hydrogenation reactor may next be flowed into a scrubber, such as a liquid scrubber (i.e., water scrubber) or the like. For example, in water scrubbing, effluent are brought into contact with water, using methods, such as bubbling the effluent through a water spray or the like. Some effluents, which are soluble in water may be removed by the scrubber. For example, an effluent such as HCl may be dissolved in water and removed from the effluent stream.

Effluent not removed by the scrubber, for example a saturated hydrocarbon, may be flowed into a thermal reactor (i.e., combustion reactor). Alternatively, in embodiments where the effluents do not require hydrogenation or scrubbing, the effluents may be flowed directly from the process chamber to the thermal reactor. An exemplary thermal reactor may, for example burn effluents, such as saturated hydrocarbons in an atmosphere of an oxygen-containing gas such as oxygen ($O_2$) to form carbon dioxide ($CO_2$) and water ($H_2O$) which can be released into the environment.

The abatement system described above is merely exemplary, and other abatement or support systems may benefit from the inventive methods and apparatus described herein. For example, a catalytic abatement system may be used, for example, in combination with a scrubber. A scrubber may be used prior to, or after an effluent is flowed into a catalytic reactor to remove gaseous or particulate components of the effluent that can damage, or reduce the effectiveness of, the catalytic reactor. The catalytic reactor may comprise a catalytic surface that catalyzes a reaction that converts the effluent into either an environmentally safe material, or a material that may be removed by, for instance, a scrubber or combustion reactor. The catalytic surface may be in the form of a structure made from catalytic material or supporting a finely divided catalyst, a bed of foam or pellets, or a coating on a wall or component of the catalytic reactor. The catalytic surfaces may be on, for example, a support structure comprising a ceramic material, such as cordierite, $Al_2O_3$, silicon carbide, silicon nitride, or the like.

As mentioned above, the apparatus 101 for monitoring the semiconductor processing system 100 includes a system adapter 102 that may be coupled to the process chamber 104 and an abatement adapter 106 that may be coupled to the abatement system 108. The system adapter 102 is coupled to the abatement adapter 106 and communicates therewith, as indicated by 105. In some embodiments, the apparatus 101 may advantageously be coupled to existing processing equipment (e.g., the process chamber 104 and the abatement system 108), thereby facilitating saving energy without investing in entirely new processing and/or abatement equipment.

Figure 2A:
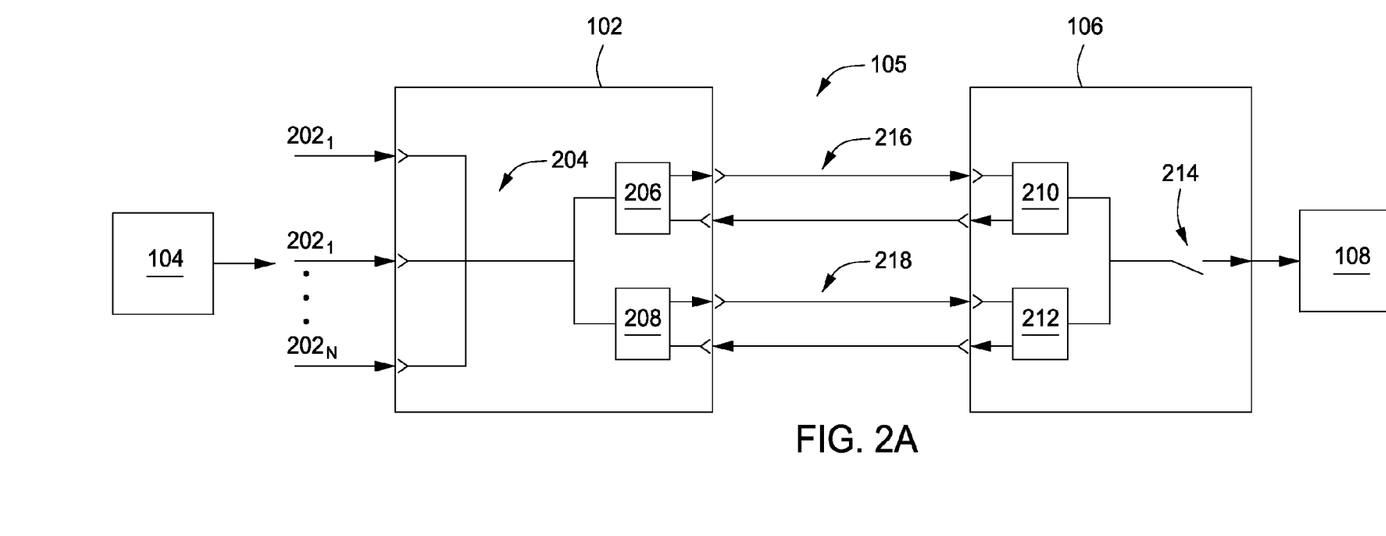
FIGS. 2A-C depicts an apparatus for monitoring a semiconductor processing system in accordance with some embodiments of present invention.

The apparatus 101 for monitoring the semiconductor processing system 100 is depicted in further detail in FIG. 2A. The apparatus 101 includes the system adapter 102 and the abatement adapter 106, which can communicate by a signaling method 105. To initiate a confirmation process for the operation of the abatement system 108 in a low power mode, the system adapter 102 confirms an idle state of the process chamber 104 by monitoring indicators $202_{1-N}$ from the process chamber 104. The indicators $202_{1-N}$ may include one or more input signals received from a pressure sensor, a digital output, an optical sensor, an RF power generator, an exhaust isolation valve, a purge gas source valve, or the like. For example, an optical sensor may be coupled to a load lock chamber for monitoring the presence of a wafer cassette. Alternatively, or in combination, a digital output may provide a signal to an electric valve, where the electric valve drives a pneumatic valve, for instance, a pneumatic valve that isolates a gas panel (not shown) from the process chamber 104. Here, for example, the indicators $202_{1-N}$ could be the signal from the digital output, a signal from a pressure sensor disposed between the gas panel and the pneumatic valve, or both. If the pressure sensor were to sense pressure, then the process chamber 104 may be in an operating state. Other indicators are possible, for example, such as signals from a system controller to the process chamber 104 and/or chamber components. Alternatively or in combination, an indicator may include monitoring a chamber exhaust isolation valve, for example, disposed between a processing volume and an exhaust volume (i.e., an exhaust port). If the isolation valve is closed, the chamber may be in an idle state. Other indicators may include, for example, monitoring valves controlling a foreline purge gas source. The purge gas source may be utilized to purge an exhaust foreline connecting an exhaust port to a pump and/or abatement system. Purge gases may be flowed even if the exhaust isolation valve is closed. Thus, monitoring valves controlling foreline purge gas sources may further confirm an idle state of a process chamber.

The indicators $202_{1-N}$ enter the system adapter 102. As illustrated in FIG. 2A, the system adapter 102 includes a state determining system 204 coupled to a heartbeat generator 206 and a logic generator 208. The state determining system 204 may receive and convert the indicators $202_{1-N}$ into a single output signal which may be transmitted to both the heartbeat generator 206 and the logic generator 208. The output signal generated by the state determining system 204 indicates the state of the process chamber 104 as either idle or running.

The state determining system 204 converts the indicators $202_{1-N}$ into a single output signal, where the output signal indicates the readiness of the process chamber 104 for abatement at low power. The state determining system 204 is illustrated in further detail in FIG. 2B, and, in some embodiments, comprises a buffer $203_{1-N}$ for receiving each indicator $202_{1-N}$ and a logic gate 205 coupled to each buffer $203_{1-N}$ for converting the indicators $202_{1-N}$ into a single output signal indicated the readiness of the process chamber 104 for abatement at low power. Each buffer $203_{1-N}$ may be any suitable buffer for making each indicator $202_{1-N}$ of a suitable signal strength or type such that the indicator may be processed by the logic gate 205. Exemplary buffers may include gain amplifiers, analog-to-digital converters, or the like.

Figure 2B:
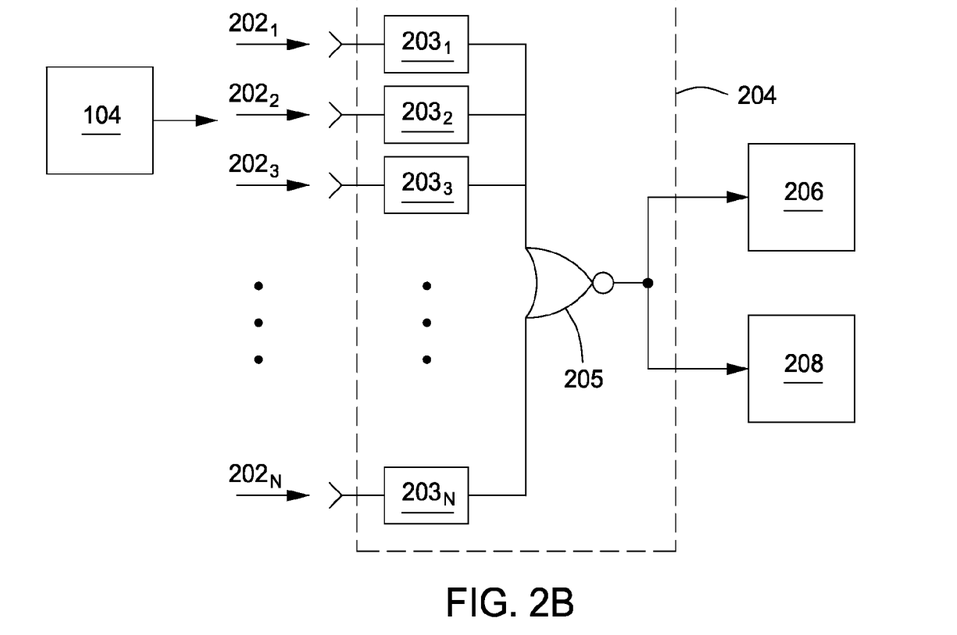

After buffering, the logic gate 205 receives each indicator $202_{1-N}$ and converts the indicators $202_{1-N}$ into a single output signal. The logic gate 205 may be any suitable logic gate or combination of logic gates that may be used to confirm readiness of the process chamber 104 for abatement at low power. For example, and as illustrated in FIG. 2B, the logic gate 205 may be configured as an NOR gate. In such a configuration, when all indicators $202_{1-N}$ indicate that the process chamber 104 is idle, an output signal for operating the abatement system 108 at low power is generated from the logic gate 205. If at least one indicator $202_{1-N}$ does not indicate that chamber 104 is idle, an output signal is generated from the logic gate 205 that indicates the chamber is still running one or more processes. The logic gate 205 advantageously provides a fail-safe mechanism whereby if a signal is missing, disconnected, or otherwise different than expected, the system adapter 102 will not signal a low-power readiness to the abatement adapter 106. The logic gate may include one or more logic gates configured to process the indicators $202_{1-N}$ as discussed above, for example, such as logic gates configured for AND, OR, NAND, and the like.

Returning to FIG. 2A, the output signal generated by the logic gate 205 is received by the heartbeat generator 206 and the logic generator 208. The heartbeat generator 206 may be, for example, a waveform generator, or the like. The heartbeat generator 206 is capable transmitting signals to, and receiving signals from, the abatement adapter 106. For example, the heartbeat generator 206 may send or receive a periodic signal, such as squares waves, sinusoidal waves, or the like at one or more frequencies and/or one or more amplitudes. The periodic signal may be sent repeatedly at a pre-determined rate, or not at all, pending the system configuration as discussed below with respect to FIGS. 3-4. The logic generator 208 may be, for example, a microcontroller, a microprocessor, a logical state machine, or the like. The logic generator 208 is capable of transmitting messages to, and receiving messages from the abatement adapter 106. Such messages may include encrypted messages, such as bit serial messages or the like. The messages may be sent repeatedly at a pre-determined rate, or not at all, pending the system configuration as discussed below with respect to FIGS. 3-4.

The periodic signal and the message sent by the heartbeat generator 206 and the logic generator 208 are received by the abatement adapter 106. As depicted in FIG. 2A, the abatement adapter 106 includes a heartbeat generator 210, a logic generator 208, and an abatement control system 214. The heartbeat generator 210 may send a periodic signal to, and receive a periodic signal from, the system adapter 102. For example, the heartbeat generator 210 may send a periodic signal to, and receive a periodic signal from, the heartbeat generator 206 of the system adapter 102. The logic generator 208 may send a message to, and receive a message from, the system adapter 102. For example, the logic generator 208 may send a message to, and receive a message from, the logic generator 208 of the system adapter 102. The heartbeat generator 210 and the logic generator 208 are coupled to the abatement control system 214, where the abatement control system 214 may signal the abatement system 108 that a low power mode may be entered based on output signals received from the heartbeat generator 210 and logic generator 208.

The heartbeat generator 210 and the logic generator 212 are similar to the heartbeat generator 206 and the logic generator 208, respectively. For example, the heartbeat generator 210 may send or receive a periodic signal, such as squares waves, sinusoidal waves, or the like at one or more frequencies and/or one or more amplitudes. The periodic signal may be sent repeatedly at a pre-determined rate, or not at all, pending the system configuration as discussed below with respect to FIGS. 3-4. The logic generator 212 may be, for example, a microcontroller, a microprocessor, a logical state machine, or the like. The logic generator 212 is capable of transmitting messages to, and receiving messages from the logic generator 208. Such messages may include encrypted messages, such as bit serial messages or the like. The messages may be sent repeatedly at a pre-determined rate, or not at all, pending the system configuration as discussed below with respect to FIGS. 3-4.

Figure 2C:
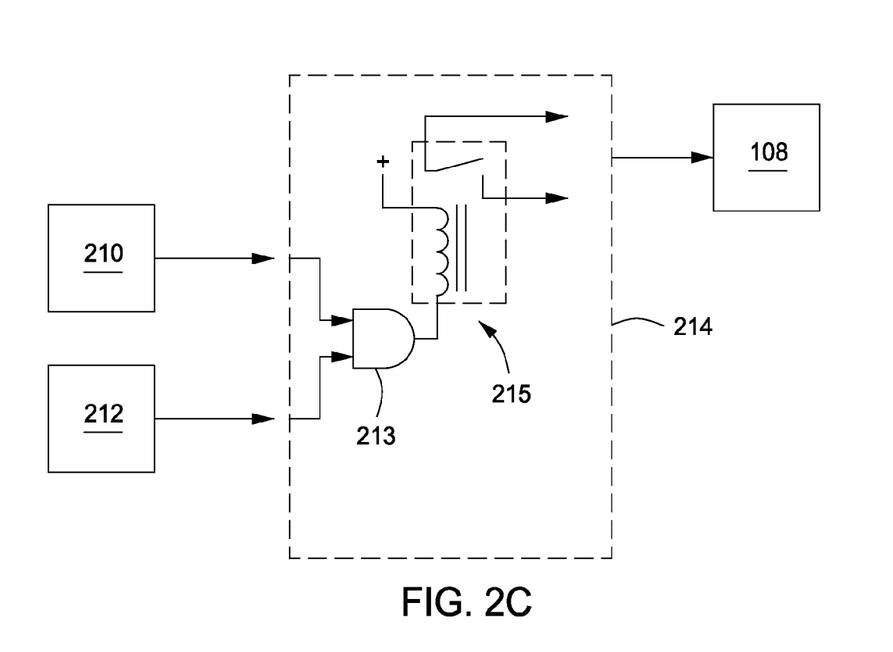

The abatement control system 214 is illustrated in further detail in FIG. 2C, and may include a logic gate 213, and a relay 215 or other output switching device. The logic gate 213 may be, for example, an AND gate as shown. However, other suitable logic gates or combinations of logic gates to perform an AND operation may be utilized. The logic gate 213 is coupled to the relay 215, and controls the operation thereof. The relay 215 may be, for example, a suitably safety-rated solid state device, such as a solid state relay or a semiconductor-based switch, a contactor, or the like. For example, when the output signals received by the logic gate 213 from the heartbeat generator 210 and the logic generator 212 confirm an idle state of the process chamber 104, the logic gate 213 activates the relay 215, where the relay 215 closes. The default position of the relay 215 may be open, and thus may be closed by activation of the relay 215. For example, when at least one of the output signals received by the logic gate 213 do not confirm an idle state of the process chamber 104, the logic gate 213 will not activate the relay 215, and operation of the abatement system 108 at full power continues. In addition, a failure of the relay 215 will not signal the abatement system 108 that low power mode can be entered.

Returning to FIG. 2A, the system adapter 102 and the abatement adapter 106 communicate using a signaling method 105. As illustrated in FIG. 2A, the signaling method 105 is a two-way signaling method, where signals travel to and from both the system adapter 102 and the abatement adapter 106. The signaling method 105 may include a periodic signal 216 being sent between the heartbeat generator 206 of the system adapter 102 and the heartbeat generator 210 of the abatement adapter 106; and a message 218 being sent between the logic generator 208 of the system adapter 102 and the logic generator 212 of the abatement adapter 106.

The periodic signal 216 as discussed above may be a square wave, sinusoidal, or the like. The periodic signal 216 may be sent at a frequency of between about 1-1000 Hz. In some embodiments, the periodic signal 216 may change in frequency with each pass between the heartbeat generator 206 and the heartbeat generator 210. For example, the heartbeat generator 206 may send the periodic signal 216 at a first frequency, for example, 1 Hz to the heartbeat generator 210. Next, the heartbeat generator 210 may return the periodic signal 216 to the heartbeat generator 206 at the same frequency (i.e., 1 Hz). The preceding example may be considered one 'pass' of the periodic signal between the heartbeat generator 206 and the heartbeat generator 210. The heartbeat generator 206, upon receiving the periodic signal 216 back from the heartbeat generator 210 may adjust the frequency of the periodic signal 216, for example, to 10 Hz, and send the adjusted periodic signal 216 to the heartbeat generator 210. Upon, receiving the adjusted periodic signal 216, the heartbeat generator 210 returns the adjusted periodic signal back to the heartbeat generator 206. Thus, a second pass has been completed between the heartbeat generator 206 and the heartbeat generator 210 with the adjusted periodic signal of 10 Hz. More passes between the heartbeat generators may be performed, adjusting the frequency of the periodic signal 216 with each pass. The periodic signaling between the heartbeat generators may provide a means of failsafe operation. For example, the periodic signal is adjusting with each pass between the heartbeat generators, thus making such an adjusting signal difficult to duplicate by another means. Further, the heartbeat generators are in two-way communication, and pass the adjusting periodic signal between them. Any disruption of the two-way communication of the adjusting periodic signal will continue operation of the abatement system 108 at full power. In some embodiments, the heartbeat generators are further configured to expect to receive a signal from another heartbeat generator at some specified interval. As such, failure of one heartbeat generator to signal the next will prevent the abatement system from being signaled that low power mode can be entered. After a specified period of time, the heartbeat generator may again start listening for a signal from an adjacent heartbeat generator as discussed herein.

The message 218 as discussed above may be an encrypted message, such as a bit serial message, or the like. In some embodiments, the message 218 may change with each pass between the logic generator 208 and the logic generator 212. For example, the logic generator 208 may send the message 218 having a first encrypted string of characters, numbers, symbols, or the like to the logic generator 212. Next, the logic generator 212 may return the first encrypted string (i.e, the same message) to the logic generator 208. The preceding example may be considered one 'pass' of the message 218 between the logic generator 208 and the logic generator 212. The logic generator 208, upon receiving the message 218 having the first string back from the logic generator 212, may change the message 218, for example, to a second string of characters, numbers, or the like, and send the second string to the logic generator 212. Upon, receiving the second string, the logic generator 212 returns the adjusted periodic signal back to the logic generator 208. Thus, a second pass has been completed between the logic generator 208 and the logic generator 212 with the second string. More passes between the logic generators may be performed, adjusting the message 218 with each pass. Similar to the periodic signaling described above, the messaging between the logic generators may provide a means of failsafe operation. For example, the message 218 is unique and unlikely to be duplicated. Further, the message 218 is changing between passes, which provides an additional means of secure communication between the system adapter 102 and the abatement adapter 106. Further, any disruption of the two-way communication of the changing message 218 will continue to cause operation of the abatement system 108 at full power.

In operation, the indicators $202_{1-N}$ may be monitored by the state determining system 204 to determine if the process chamber 104 is in an idle state. If any one indicator 202 signals that the system is not idle, an output signal may not be generated from the state determining system 204, or alternatively, an output signal may be generated and sent to the heartbeat generator 206 and logic generator 208 indicating the process chamber 104 is not in an idle state. As a result, the heartbeat generator 206 and logic generator 208 may not communicate any periodic signal 216 or message 218 to the abatement adapter 106, or alternatively, may continuously communication the same (i.e., non-changing) periodic signal 216 and message 218 between the system adapter and the abatement adapter as a means of maintaining the communication link between the system adapter 102 and abatement adapter 106. For example, as a means of failsafe operation, if the communication link were to be disabled, the abatement system 108 would continue operating at full power.

For example, if the indicators $202_{1-N}$ monitored by the state determining system 204 confirm the process chamber 104 is in an idle state, an output signal is generated from the state determining system 204 and sent to the heartbeat generator 206 and the logic generator 208. The heartbeat generator 206 and the logic generator 208 then communicate with the corresponding heartbeat generator 210 and logic generator 212 of the abatement adapter 106, either by sending a first periodic signal and a first message, or alternatively, send a new periodic signal (e.g., at a different frequency) and a new message (e.g., a different message). For example, the first periodic signal and the first message indicate to the abatement adapter that the process chamber is idle and ready for abatement in a low power mode. The heartbeat generator 210 and the logic generator 212 communicate the first periodic signal and the first message back to the heartbeat generator 206 and logic generator 208 confirming the first periodic signal and first message have been received. Thus, a first pass using the first periodic signal and first message has been completed as discussed above.

Upon receiving the first periodic signal and first message back, the heartbeat generator 206 and logic generator 208 next send a second periodic signal and a second message to the heartbeat generator 210 and the logic generator 212. The second periodic signal and second message are different from the first periodic signal and first message. For example, the second periodic signal may have a different frequency and the second message may be a different message. The heartbeat generator 210 and the logic generator 212 of the abatement adapter 106 receive the second periodic signal and second message, and send both back to the system adapter 102, thus completing a second pass. Multiple passes may be performed between the system adapter 102 and the abatement adapter 106, each pass having a different periodic signal and different message than the preceding pass. In some embodiments, each successive periodic signal may be at a higher frequency than the preceding signal. In some embodiments, each successive message passed between the system adapter 102 and the abatement adapter 106 may be altered in content, voltage level, bit rate, or combinations thereof, for example, so as to preclude defeating of the logical function by casual means. In some embodiments, each successive adapter (e.g., the system adapter 102 and the abatement adapter 106) may alter or add a bit field within the message so as to indicate that an active and compatible device (e.g., either of the system adapter 102 or the abatement adapter 106) has read the incoming messages and acknowledged their validity prior to re-transmitting them. In some embodiments, the above technique of altering messages may be utilized for additional functions, such as for providing feedback to the message originator (e.g., one of the system adapter 102 or the abatement adapter 106) as to the identity or status of the receiving devices or abatement equipment connected to them (e.g., the other of the system adapter 102 or the abatement adapter 106).

After a sufficient number of passes of a changing periodic signal and changing message between the system adapter 102 and the abatement adapter 106, the system adapter 102 has conveyed to the abatement adapter 106 that the process chamber 104 is in an idle state and ready for low power abatement. In some embodiments, a sufficient number of passes may be defined as, about one, or between about 1 to about 100, or more. In some embodiments, a sufficient number of passes is about 50. Next, the heartbeat generator 210 and logic generator 212 signal to the abatement control system 214 that the abatement system 108 may be operated in a lower power mode. As a further means of failsafe operation, both the heartbeat generator 210 and the logic generator 212 must agree that the process chamber 104 is in an idle state, for the abatement system 108 to be signaled to operate in a lower power mode. Thus, the logic gate 213 of the abatement control system 214 will only close the relay 215 when it receives a confirmation signal from both the heartbeat generator 210 and the logic generator 212. Upon receiving the confirmation signal from each generator, the relay 215 closes and the abatement system 108 is signaled that is may be switched into a low power mode.

The abatement system 108 may operate in the low power mode provided the indicators $202_{1-N}$ indicate the process chamber 104 is in an idle state. If at least one indicator 202 changes or is disconnected, the abatement system 108 will return to abatement at full power. If the communication link between the system adapter 102 and abatement adapter 106 is disconnected, or at least one of the two-way communications between the heartbeat generators or logic generators is disconnected and/or interrupted, the abatement system 108 will return to abatement at full power. Further, if power is interrupted (e.g., turned off) to the process chamber, process chamber components, system adapter, abatement adapter, or any device configured to operate with the process system 100, the abatement system 108 will return to operation at full power. Thus, several redundant failsafe mechanisms are included in the apparatus 101 for operation of the abatement system 108 in a lower power mode when confirmation can be made that the process chamber 104 is in an idle state.

Figure 3:
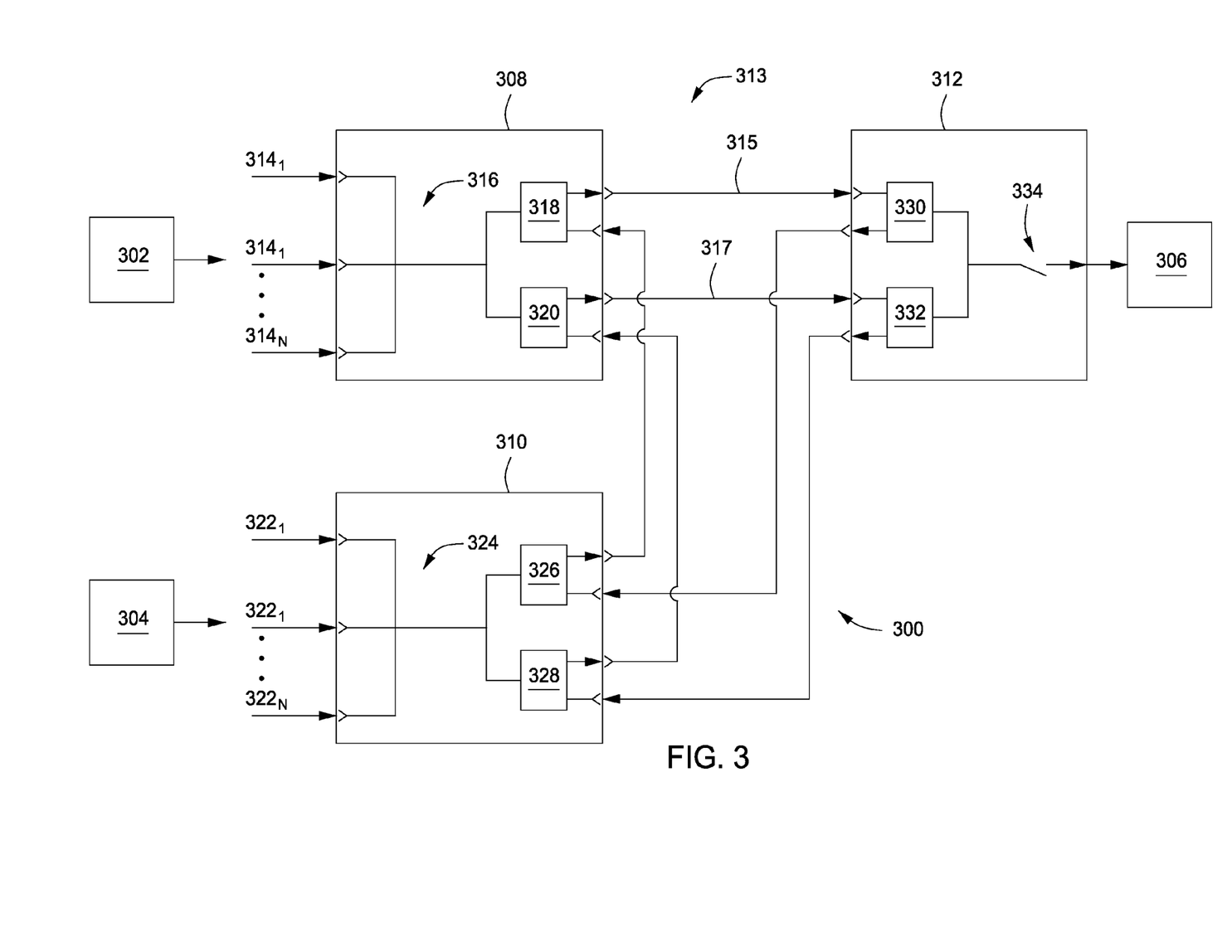
FIG. 3 depicts an apparatus for monitoring a semiconductor processing system in accordance with some embodiments of present invention.

The inventive apparatus described herein may be utilized with semiconductor processing systems having two or more processing chambers couple to one abatement system, or two or more processing chambers coupled to two or more abatement systems as described below in FIGS. 3 and 4. For example, and as illustrated in FIG. 3, an apparatus 300 may be utilized for monitoring a semiconductor processing system comprising a first process chamber 302, a second process chamber 304, and an abatement system 306, where each process chamber is coupled to the abatement system 306 for the exhaust of effluents thereto. The process chambers 302, 304 and the abatement system 306 may be any suitable configuration of process chamber or abatement system as described above.

The apparatus 300 includes a first system adapter 308 for monitoring the state of the first process chamber 302 and a second system adapter 310 for monitoring the state of a second process chamber 304. The first system adapter 308 and the second system adapter 310 are configured to communicate with an abatement adapter 312, where the abatement adapter 312 is coupled to the abatement system 306 and configured to communicate a readiness to operate the abatement system at a low power mode in response to the state of the process chambers. The first system adapter 308, the second system adapter 310 and the abatement adapter 312 communicate by a signaling method 313.

The first system adapter 308 may be similar to the embodiments of the system adapter 102 as discussed above. As such, the first system adapter 308 includes a state determining system 316 coupled to a heartbeat generator 318 and a logic generator 320. The state determining system 316 may receive and convert the one or more indicators $314_{1-N}$ from the first process chamber 302 into a single output signal which may be transmitted to both the heartbeat generator 318 and the logic generator 320. The output signal generated by the state determining system 316 indicates the state of the first process chamber 302 as either idle or running. Further, the state determining system 316, the heartbeat generator 318, and the logic generator 320 may be similar to those described above with respect to FIG. 2A-B. For example, the heartbeat generator 318 can send and receive a periodic signal, and the logic generator 320 can send and receive an encrypted message.

The second system adapter 310 may be similar to the embodiments of the system adapter 102 as discussed above. As such, the second system adapter 310 includes a state determining system 324 coupled to a heartbeat generator 326 and a logic generator 328. The state determining system 324 may receive and convert the one or more indicators $322_{1-N}$ from the second process chamber 304 into a single output signal which may be transmitted to both the heartbeat generator 326 and the logic generator 328. The output signal generated by the state determining system 324 indicates the state of the second process chamber 304 as either idle or running. Further, the state determining system 324, the heartbeat generator 326, and the logic generator 328 may be similar to those described above with respect to FIG. 2A-B. For example, the heartbeat generator 326 can send and receive a periodic signal, and the logic generator 328 can send and receive an encrypted message as discussed above.

The abatement adapter 312 may be similar to the embodiments of the abatement adapter 106 as discussed above with respect to FIGS. 2A and 2C. As such, the abatement adapter 312 includes a heartbeat generator 330, a logic generator 332, and an abatement control system 334. The heartbeat generator 330 and the logic generator 332 are coupled to the abatement control system 334, where the abatement control system 334 may switch the abatement system 306 into a low power mode based on output signals received from the heartbeat generator 330 and logic generator 332. Further, the abatement control system 334, the heartbeat generator 332, and the logic generator 334 may be similar to those described above with respect to FIGS. 2A and 2C. For example, the heartbeat generator 330 can send and receive a periodic signal, and the logic generator 332 can send and receive an encrypted message as discussed above.

The signaling method 313 may be generally similar to the signaling method 105. The signaling method 313 may include the communication of both a periodic signal 315 and a message 317 between the adapters of the apparatus 300. However, contrary to the two-way signaling between the system adapter 102 and abatement adapter 106, the signaling method 313 includes a circular, or 'pass it along' signaling scheme. For example, the periodic signal 315 or the message 317 may be generated at the first system adapter 308 and then passed to the abatement adapter 312. From the abatement adapter 312, the periodic signal 315 or the message 317 may then be passed to the second system adapter 310 and ultimately back to the first system adapter 308. As such, the signaling method 313, as illustrated in FIG. 3 proceeds in a clockwise motion through the adapters of the apparatus 300. However, this clockwise motion is merely illustrative, and other configurations of the signaling method are possible. For example, the periodic signal 315 or message 317 may originate at the second system adapter 310. From the second system adapter 310, the periodic signal 315 or the message 317 may be passed along to either the first system adapter 308 (i.e., in a clockwise motion), or alternatively, to the abatement adapter 312 (i.e., in a counter clockwise motion). Thus, the periodic signal 315 and message 317 may originate at either the first or second system adapters indicating that either of the first or second process chambers are idle and ready for abatement in a low power mode. As a means of failsafe operation, the apparatus 300 will signal the abatement system 306 to operate in a low power mode only when both the first and second process chamber are in an idle state.

In operation, and in one exemplary configuration, the indicators $314_{1-N}$ may be monitored by the state determining system 316 of first system adapter 308. If the indicators $314_{1-N}$ confirm that the first process chamber 302 is in an idle state, the state determining system 316 sends an output signal to the heartbeat generator 318 and the logic generator 320 to initiate the periodic signal 315 and message 317, or alternatively to adjust an existing periodic signal and message as discussed above. For example, the heartbeat generator 318 may adjust the periodic signal 315 to a higher frequency, for example, 10 Hz from 1 Hz, and the logic generator 320 may change the message 317, where the adjust periodic signal and new message indicate that the first process chamber 302 is in an idle state and ready for abatement at low power.

The adjusted periodic signal and new message are passed from the first system adapter 308 to the corresponding heartbeat generator 330 and logic generator 332 of the abatement adapter 312. The abatement adapter 312 receives the adjusted periodic signal and new message and through the heartbeat generator 330 and logic generator 332 re-transmits the adjusted periodic signal and new message to corresponding heartbeat generator 326 and logic generator 328 of the second system adapter 310. If the indicators $322_{1-N}$ indicate that the second process chamber is in an idle state and ready for abatement at low power, then the heartbeat generator 326 and the logic generator 328 will re-transmit the adjusted periodic signal and the new message back to the first system adapter 308. Thus, communicating to the first system adapter 308 that the second process chamber 302 is also in an idle state and ready for abatement at low power.

However, if the second process chamber 304 is not in an idle state, then the second system adapter 310 does not re-transmit the adjusted periodic signal and new message to the first system adapter 308. In such embodiments, the second system adapter 310 may continue transmitting the original periodic signal (i.e., at 1 Hz) and the original message, or alternatively, may not transmit any periodic signal and message to the first system adapter 308, as a means of signaling that the second process chamber 304 is still running and not ready for abatement at low power. When the first system adapter 308 receives the original periodic signal and original message, as opposed to the adjusted periodic signal and new message that were sent, the first system adapter 308 may continue to send the adjusted periodic signal and new message until the first system adapter 308 receives the adjusted periodic signal and the new message from the second system adapter 310, which indicates that the second process chamber 304 is in an idle state and ready for abatement at low power.

In some embodiments, where the second process chamber 304 is in an idle state and ready for abatement at low power, then second system adapter 310 re-transmits the adjusted periodic signal and the new message to the first system adapter 308 from which the adjusted periodic signal and new message originated. Thus, as discussed above, the adjusted periodic signal and new message have made one 'pass' around the adapters of the apparatus 300. Upon receiving the adjusted periodic signal and new message confirming that the second process chamber 304 is also in an idle state, the first system adapter 308 transmits a second adjusted periodic signal, for example, at a frequency of 20 Hz, and a second new message to the abatement adapter 312. Upon completion of the second pass with the second adjusted periodic signal and second new message, the first system adapter 308 transmits a third adjusted periodic signal and third new message. The first system adapter 308 continues transmitting a new adjusted periodic signal and new message with each successful pass, until the abatement adapter 312 has confirmed that both the first and second process chambers are in an idle state and ready for abatement at low power. When confirmation has been made, the heartbeat generator 330 and logic generator 332 of the abatement adapter 312 transmit an output signal to the abatement control system 334 to signal the abatement system 306 that it may operate in a low power mode.

As discussed above, any break in the communication loop between the adapters of the apparatus 300, loss of power, disconnect of indicators on either the first or second process chambers, will return the abatement system 306 to operation at full power.

The inventive apparatus described herein may be utilized with a semiconductor or other processing system having a plurality of process chambers and a plurality of abatement or support systems. For example, and as illustrated in FIG. 4, an apparatus 400 may be utilized for monitoring a semiconductor processing system comprising a first process chamber 402, a second process chamber 404, a first abatement system 406, and a second abatement system 408. For example, in some embodiments, the first and second process chambers may exhaust effluents to either or both of the first or second abatement systems. The first and second process chambers 402, 404 and the first and second abatement systems 406, 408 may be any suitable configuration of process chamber or abatement system as described above.

The apparatus 400 includes a first system adapter 410 for monitoring the state of the first process chamber 402 and a second system adapter 412 for monitoring the state of a second process chamber 404. The first and second system adapters 410, 412 are configured to communicate with a first and second abatement adapter 414, 416, where the first abatement adapter 414 is coupled to the first abatement system 406 and the second abatement adapter 416 is coupled to the second abatement system 408. The first and second abatement adapters may be configured to communicate a readiness to operate the first and second abatement systems 406, 408 in low power modes in response to the state of the process chambers. The first system adapter 410, the second system adapter 412, the first abatement adapter 414, and the second abatement adapter 416 communicate by a signaling method 445. The signaling method 445 includes passing a periodic signal 446 and a message 448 between the adapters of the apparatus 400.

The first and second system adapters 410, 412 may be similar to the embodiments of any system adapter as discussed above. As such, the first system adapter 410 includes a state determining system 420 coupled to a heartbeat generator 422 and a logic generator 424. The state determining system 420 may receive and convert the one or more indicators $418_{1-N}$ from the first process chamber 402 into a single output signal which may be transmitted to both the heartbeat generator 422 and the logic generator 424. The output signal generated by the state determining system 420 indicates the state of the first process chamber 402 as either idle or running. Similarly, the second system adapter 412 includes a state determining system 428 coupled to a heartbeat generator 430 and a logic generator 432. The state determining system 428 may receive and convert the one or more indicators $426_{1-N}$ from the second process chamber 404 into a single output signal which may be transmitted to both the heartbeat generator 430 and the logic generator 432. The output signal generated by the state determining system 428 indicates the state of the second process chamber 404 as either idle or running. Further, the state determining systems 420,428, the heartbeat generators 422, 430 and the logic generators 424, 432 may be similar to those described above with respect to FIG. 2A-B. For example, each heartbeat generator can send and receive a periodic signal, and each logic generator can send and receive an encrypted message.

The first and second abatement adapters 414, 416 may be similar to the embodiments of any abatement adapter as discussed above. As such, the first abatement adapter 414 includes a heartbeat generator 434, a logic generator 436, and an abatement control system 438. The heartbeat generator 434 and the logic generator 436 are coupled to the abatement control system 438, where the abatement control system 438 may switch the abatement system 406 into a low power mode based on output signals received from the heartbeat generator 434 and logic generator 436. Similarly, the second abatement adapter 416 includes a heartbeat generator 440, a logic generator 442, and an abatement control system 444. The heartbeat generator 440 and the logic generator 442 are coupled to the abatement control system 444, where the abatement control system 444 may switch the abatement system 408 into a low power mode based on output signals received from the heartbeat generator 440 and logic generator 442. Further, the abatement control system 438, 444, the heartbeat generator 434, 440, and the logic generator 436, 442 may be similar to those described above with respect to FIGS. 2A and 2C. For example, each heartbeat generator can send and receive a periodic signal, and each logic generator can send and receive an encrypted message as discussed above.

The signaling method 445 may be generally similar to the signaling method 313. The signaling method 445 may include the communication of both the periodic signal 446 and the message 448 between the adapters of the apparatus 400. The signaling method 445 includes a circular, or 'pass it along' signaling scheme. For example, the periodic signal 446 or the message 448 may be generated at the first system adapter 410 and then passed to the first abatement adapter 414. From the first abatement adapter 414, the periodic signal 446 or the message 448 may then be passed to the second abatement adapter 416. From the second abatement adapter 416, the periodic signal 446 or message 448 may be passed to the second system adapter 412 and ultimately back to the first system adapter 410. As such, the signaling method 445, as illustrated in FIG. 4 proceeds in a clockwise motion through the adapters of the apparatus 400. However, this clockwise motion is merely illustrative, and other configurations of the signaling method are possible as discussed above with respect to FIG. 3. For example, the periodic signal 446 or message 448 may originate at the second system adapter 412. From the second system adapter 412, the periodic signal 446 or the message 448 may be passed along to either the first system adapter 410 (i.e., in a clockwise motion), or alternatively, to the second abatement adapter 416 (i.e., in a counter clockwise motion). Thus, the periodic signal 446 and message 448 may originate at either the first or second system adapters indicating that either of the first or second process chambers are idle and ready for abatement in a low power mode. As a means of failsafe operation, the apparatus 400 will signal the first and second abatement systems 406, 408 that they may operate in low power modes only when both the first and second process chamber are in an idle state.

In operation, and in one exemplary configuration, the indicators $418_{1-N}$ may be monitored by the state determining system 420 of first system adapter 410. If the indicators $418_{1-N}$ confirm that the first process chamber 402 is in an idle state, the state determining system 420 sends an output signal to the heartbeat generator 422 and the logic generator 424 to initiate the periodic signal 446 and message 448, or alternatively to adjust an existing periodic signal and message as discussed above. For example, the heartbeat generator 422 may adjust the periodic signal 445 to a higher frequency, for example, 10 Hz from 1 Hz, and the logic generator 424 may change the message 448, where the adjust periodic signal and new message indicate that the first process chamber 402 is in an idle state and ready for abatement at low power.

Figure 4:
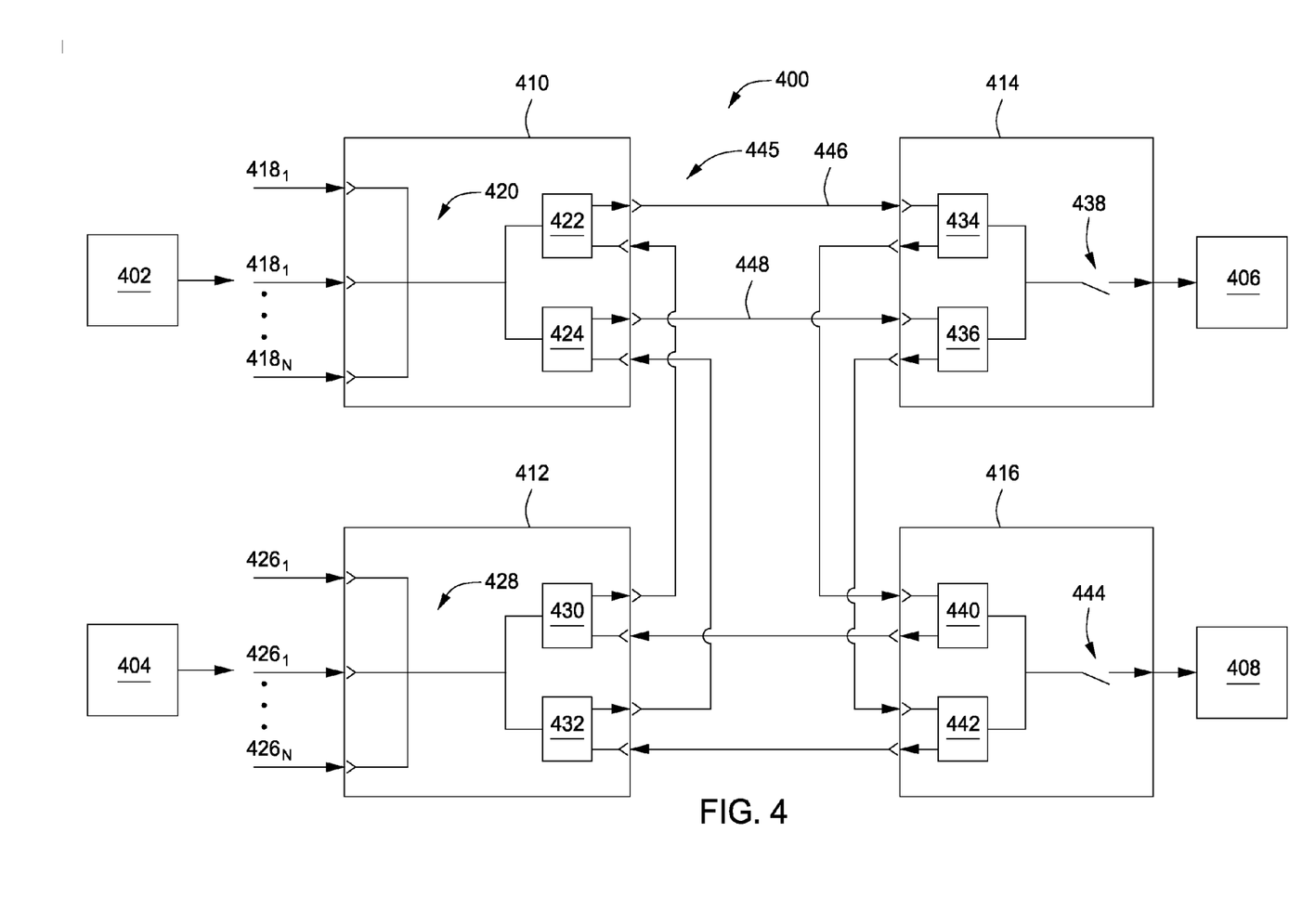
FIG. 4 depicts an apparatus for monitoring a semiconductor processing system in accordance with some embodiments of present invention.

As depicted in FIG. 4, the adjusted periodic signal and new message may be transmitted in a clockwise motion around the adapters of the apparatus 400. Similar to signaling method 313, one 'pass' of the adjusted periodic signal and new message consists of the adjusted periodic signal and new message being transmitted and/or received by each adapter and returned to the adapter (i.e., the first system adapter 410) where the adjusted periodic signal and the new message originated. For example, and as discussed above, if the second process chamber 412 was not in an idle state, the adjusted signal and new message would not be permitted to complete one pass.

When the adjusted periodic signal and the new message complete one pass, the adapter that originated the adjusted periodic signal and new message may respond by sending a second adjusted periodic signal and second new message. With each successful pass, the originating adapter (i.e., the first system adapter 410) may adjust the periodic signal and change the message, until the first and second abatement adapters 414, 416 have confirmed that both the first and second process chambers 402, 404 are in idle states and ready for abatement in low power. Upon confirmation, the first and second abatement adapters 414, 416 switch the first and second abatement systems 406, 408 into low power modes as discussed above.

As discussed above, any break in the communication loop between the adapters of the apparatus 400, loss of power, disconnect of indicators on either the first or second process chambers, will return the abatement systems 406, 408 to operation at full power.

The inventive apparatus described herein can be utilized with any suitable semiconductor processing system having any desired number of process chambers and abatement systems. As such, the inventive apparatus may include any appropriate number of system adapters and abatement adapters as the processing system may require. The system adapters and abatement adapters may be configured as described above to 'pass' a periodic signal and message to each adapter of the inventive apparatus such that each abatement adapter may operate each abatement system in a low power mode when each system adapter has confirmed that each process chamber is in an idle state and ready for abatement at low power.

As noted above, the inventive methods and apparatus may also be used to control additional support equipment, such as other energy consuming equipment associated with the processing equipment. Non-limiting examples of such support equipment include turbo pumps, roughing pumps, purge gas supplies, process water chillers, facilities cooling water loops, chamber cooling loops, heat exchangers, and yet others. These may also yield significant energy savings when switched to low energy modes during wafer processing idle times. The inventive apparatus, by virtue of its modular and scalable design, is particularly well suited to control such devices in addition to abatement equipment.

In addition, the inventive methods and apparatus need not be limited to semiconductor equipment, and may be utilized with a broad range of equipment. For example, the inventive apparatus may be retrofit to abatement and support equipment on power generating equipment, chemical processing equipment, refineries, and the like. The inventive apparatus advantageously may be more robust, secure, and more easily expandable than conventional voltage or current loop interlocks typically used in the aforementioned applications.

Thus, methods and apparatus for monitoring a semiconductor process chamber has been provided herein. The inventive apparatus advantageously monitors a plurality of indicators to confirm that a process chamber is, in fact, in an idle state prior to operating an abatement system at a low power mode. Further, the inventive apparatus includes a failsafe mechanism, such that if any indicator, communication link between a system and an abatement adapter, system power, or the like were disconnected, the abatement system would return to operation at full power.

While the foregoing is directed to embodiments of the present invention, other and further embodiments of the invention may be devised without departing from the basic scope thereof.

The invention claimed is:

1. An apparatus for monitoring a substrate processing system, comprising:
    a first system adapter for monitoring a first process chamber and determining a state thereof; and a first support adapter for communicating with the first system adapter and a first support system coupled to the first process chamber, the support adapter configured to communicate a readiness to operate the support system at a low power mode to a controller of the support system in response to the state of the process chamber being in an idle mode, wherein the first system adapter is configured to communicate the state of the first process chamber to the first support adapter by sending a periodic signal at a desired frequency to the first support adapter and by sending a message to the first support adapter, and wherein the first support adapter is configured to communicate the readiness to operate the first support system at the low power mode to the first system adapter by re-transmitting the periodic signal at the desired frequency to the first support adapter and by re-transmitting the message to the first support adapter.

2. The apparatus of claim 1, wherein the first support system is an abatement system.

3. The apparatus of claim 1, wherein the first system adapter further comprises:
a state determining system for receiving one or more indicator signals from the first process chamber and converting the one or more indicator signals into a single output signal.

4. The apparatus of claim 3, wherein the single output signal indicates an idle or operating state of the first process chamber.

5. The apparatus of claim 4, wherein the single output signal indicates readiness to operate the support system at a low power mode when all of the one or more indicator signals indicate the first process chamber is in an idle state.

6. The apparatus of claim 3, wherein the first system adapter further comprises:
a first waveform generator coupled to the state determining system capable of sending and receiving the periodic signal; and
a first logic generator coupled to the state determining system capable of sending and receiving the message.

7. The apparatus of claim 6, wherein the support adapter further comprises:
a second waveform generator capable of receiving and retransmitting the periodic signal; and
a second logic generator capable of receiving and retransmitting the message.

8. The apparatus of claim 7, where the support adapter further comprises:
a control system coupled to the second waveform and second logic generators for signaling the support system to operate in a low power mode.

9. The apparatus of claim 7, wherein no periodic signal and no message are sent by the system adapter to the support adapter when the first process chamber is determined to be in an operating state.

10. The apparatus of claim 7, wherein the same periodic signal and the same message are relayed between the system adapter and the support adapter when the first process chamber is determined to be in an operating state.

11. The apparatus of claim 7, wherein a first periodic signal and a first message are sent by the system adapter to the support adapter and wherein the first periodic signal and the first message are retransmitted to the system adapter by the support adapter.

12. The apparatus of claim 11, wherein a second periodic signal and a second message different from the first periodic signal and first message are sent by the system adapter upon receiving the retransmitted first periodic signal and the retransmitted first message when the first process chamber has been determined to be in an idle state.

13. The apparatus of claim 1, further comprising:
a second system adapter for monitoring a second process chamber and determining a state thereof, wherein the second system adapter is configured to communicate with the first system adapter.

14. The apparatus of claim 13, wherein the second system adapter is configured to communicate with the first support adapter.

15. The apparatus of claim 14, wherein the first support adapter signals the support system to operate in a low power mode when both the first and second process chambers are determined to be in an idle state.

16. The apparatus of claim 1, further comprising:
a second system adapter for monitoring a second process chamber and determining a state thereof; and
a second support adapter for communicating with the second system adapter and a second support system coupled to the second process chamber, the second support adapter configured to communicate a readiness to operate the second support system at a low power mode in response to the state of the second process chamber.

17. The apparatus of claim 16, wherein the second system adapter is configured to communicate with the first system adapter.

18. The apparatus of claim 16, wherein the second support adapter is configured to communicate with the first support adapter.

19. The apparatus of claim 16, wherein the second support system is an abatement system.

20. The apparatus of claim 16, wherein the first and second support adapters signal the first and second support systems to operate in a low power mode when both the first and second process chambers are determined to be in an idle state.

21. An apparatus for monitoring a substrate processing system, comprising:
a first system adapter for monitoring a first process chamber and determining a state thereof, wherein the first system adapter includes a state determining system for receiving one or more indicator signals from the first process chamber and converting the one or more indicator signals into a single output signal, a first waveform generator coupled to the state determining system capable of sending and receiving a periodic signal, and a first logic generator coupled to the state determining system capable of sending and receiving a message; and
a first support adapter for communicating with the first system adapter and a first support system coupled to the first process chamber, the support adapter configured to communicate a readiness to operate the support system at a low power mode to a controller of the support system in response to the state of the process chamber being in an idle mode, wherein the support adapter includes a second waveform generator capable of receiving and retransmitting the periodic signal, and a second logic generator capable of receiving and retransmitting the message,
wherein one of (a) no periodic signal and no message are sent by the system adapter to the support adapter when the first process chamber is determined to be in an operating state, or (b) the same periodic signal and the same message are relayed between the system adapter and the support adapter when the first process chamber is determined to be in an operating state.

22. An apparatus for monitoring a substrate processing system, comprising:
- a first system adapter for monitoring a first process chamber and determining a state thereof, wherein the first system adapter includes a state determining system for receiving one or more indicator signals from the first process chamber and converting the one or more indicator signals into a single output signal, a first waveform generator coupled to the state determining system capable of sending and receiving a periodic signal, and a first logic generator coupled to the state determining system capable of sending and receiving a message; and
- a first support adapter for communicating with the first system adapter and a first support system coupled to the first process chamber, the support adapter configured to communicate a readiness to operate the support system at a low power mode to a controller of the support system in response to the state of the process chamber being in an idle mode, wherein the support adapter includes a second waveform generator capable of receiving and retransmitting the periodic signal, and a second logic generator capable of receiving and retransmitting the message,
- wherein a first periodic signal and a first message are sent by the system adapter to the support adapter and wherein the first periodic signal and the first message are retransmitted to the system adapter by the support adapter, and
- wherein a second periodic signal and a second message different from the first periodic signal and first message are sent by the system adapter upon receiving the retransmitted first periodic signal and the retransmitted first message when the first process chamber has been determined to be in an idle state.

* * * * *